United States Patent [19]

Yamamoto et al.

[11] Patent Number: 4,660,844
[45] Date of Patent: Apr. 28, 1987

[54] STEERING SYSTEM FOR VEHICLES

[75] Inventors: Osamu Yamamoto, Tochigi; Shoichi Sano, Tokyo; Yoshimi Furukawa, Tochigi, all of Japan

[73] Assignee: Honda Giken Kogyo Kabushiki Kaisha, Tokyo, Japan

[21] Appl. No.: 684,057

[22] Filed: Dec. 20, 1984

[30] Foreign Application Priority Data

Dec. 23, 1983 [JP] Japan .................. 58-243352
Dec. 23, 1983 [JP] Japan .................. 58-243353

[51] Int. Cl.⁴ ............................ B62D 5/10
[52] U.S. Cl. .......................... 280/91; 280/99
[58] Field of Search ............ 280/91, 707, 99; 180/140

[56] References Cited

U.S. PATENT DOCUMENTS

3,596,730 8/1971 Cecce ........................ 280/91
4,105,086 8/1978 Ishii et al. .................. 280/91
4,185,845 1/1980 Misch et al. ................ 280/707
4,313,514 2/1982 Furukawa et al. ............ 280/91

Primary Examiner—John J. Love
Assistant Examiner—Ross Weaver
Attorney, Agent, or Firm—Irving M. Weiner; Joseph P. Carrier; Pamela S. Burt

[57] ABSTRACT

A steering system for a vehicle with a front wheel and a rear wheel, in which the rear wheel is steerable in relation to a steering operation of the front wheel, such that a ratio control of a steered angle ratio of the rear wheel to the front wheel is effected to be variable in accordance with a travelling speed of the vehicle. The steering system is provided with a mode selecting unit adapted to be manually operable for exclusively setting an arbitrary one of a plurality of control modes of the ratio control. The steering system may be further provided with a time-delay unit for gradually effecting the ratio control, when changing one of the control modes to another thereof.

5 Claims, 10 Drawing Figures

STEERING SYSTEM FOR VEHICLES

BACKGROUND OF THE INVENTION

1. Field of the Invention

The present invention relates generally to a steering system for vehicles. More particularly, the invention relates to a steering system for a vehicle with a front wheel and a rear wheel, of the type in which the rear wheel is steerable in relation to a steering operation of the front wheel, especially such that the rear wheel has a steered angle ratio thereof relative to the front wheel controlled to be variable.

2. Description of Relevant Art

There has already been proposed, in Japanese Laid Open Application No. JP-A-59-26364, a steering system for a vehicle with a front wheel and a rear wheel, in which the rear wheel is steerable in relation to a steering operation of the front wheel, such that a steered angle ratio of the rear wheel to the front wheel is controlled to be variable in accordance with a travelling speed of the vehicle.

Figure 5:
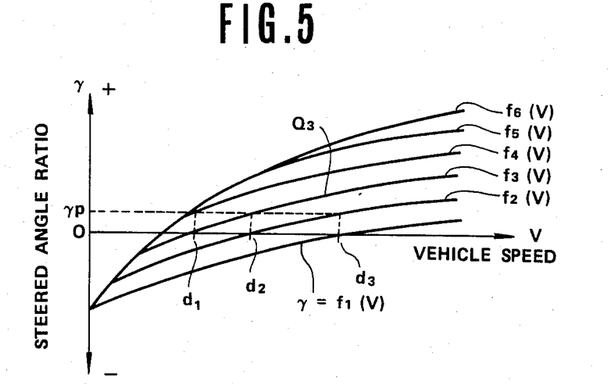
FIG. 5 is a graph plotting respective characteristic functions of a plurality of ratio control modes of the control part of FIG. 4.

More particularly, in such steering system, at relatively low vehicle speeds the rear wheel is steered in the opposite direction to the front wheel or substantially at an angle of zero degree and, at relatively high vehicle speeds, in the same direction as the front wheel. With reference to FIG. 5 of the accompanying drawings, the steered angle ratio is given as a continuous function of the vehicle speed, as represented by a curve $Q_3: \gamma = f_3(V)$, such that for an arbitrary vehicle speed V higher than a predetermined vehicle speed $d_1$, there is given a positive angle ratio $\gamma$, i.e., the front and rear wheels are steered in the same direction. For an arbitrary vehicle speed V lower than the predetermined vehicle speed $d_1$, there is given a negative angle ratio, i.e., the front and rear wheels are steered in opposite directions to each other, whereby a continuous control of the steered angle ratio is attained, ranging from a low speed to a high speed. As a result, at relatively low vehicle speeds, the minimum turning radius of the vehicle as well as the inside wheel span is remarkably reduced, and in addition the vehicle turning characteristics such as when parking, travelling along a narrow curved road, or making a U-turn, are improved. Moreover, at relatively high vehicle speeds, the steering responsiveness can be greatly improved.

In a vehicle with such a steering system, a rear wheel is automatically controlled so as to have a steered angle ratio thereof to a front wheel determined through a given function $f_3(V)$ in correspondence with a vehicle speed V.

However, under particular conditions such as on an expressway, which is designed substantially straight, small-turn operations are seldom required, i.e., only relatively infrequent lane changes are required, even when the vehicle is forced to low-speed travel by traffic jams and the like.

In this respect, in a vehicle with a steering system of the above-mentioned type, the driver will be afforded greater convenience if the steering system is improved to be intentionally flexible and voluntarily changeable with respect to the steering characteristics, in accordance with subjective factors such as the preference or physical condition of the driver while travelling, so that the steered angle ratio can be set, at low speeds of the vehicle, to be negative as in the conventional case, permitting very tight turns such as in a U-turn operation; and, at medium and slightly higher speeds, not only positive, but rather somewhat negative, to thereby provide the steering characteristic with a sporty feel.

The present invention provides an improvement in a steering system for vehicles of the above-mentioned type.

SUMMARY OF THE INVENTION

The present invention provides a steering system for a vehicle with a front wheel and a rear wheel, including a steering wheel, a front wheel steering means for steering the front wheel, a rear wheel steering means for steering the rear wheel, a ratio changing means for changing a steered angle ratio of the rear wheel to the front wheel, a control means for controlling the ratio changing means, a ratio detecting means for detecting the steered angle ratio, the ratio detecting means cooperating with the control means, and a speed detecting means for detecting a vehicle speed of the vehicle, the speed detecting means cooperating with the control means. A ratio control of the steered angle ratio is effected to be variable in accordance with the vehicle speed, and a mode selecting means adapted to be manually operable and operatively connected to the control means is provided for exclusively selecting an arbitrary one of a plurality of control modes of the ratio control.

The steering system may be further provided with a time-delay means for gradually outputting a control signal from the control means to the ratio changing means when one of the control modes is changed to another thereof.

Accordingly, an object of the present invention is to provide a steering system for a vehicle with a front wheel and a rear wheel, in which a steered angle ratio of the rear wheel to the front wheel is put under a ratio control having a plurality of voluntarily selectable control modes, thereby permitting an optimum steering operation, as circumstances require.

Another object of the present invention is to permit, in the aforesaid steering system, when one of the control modes is changed to another thereof by a driver's operation, a gradual transfer from a set state of the steered angle ratio before the operation to another set state thereof after the operation, to thereby facilitate steering of the vehicle.

The above and further objects, details and advantages of the present invention will become apparent from the following detailed description of preferred embodiments thereof when read in conjunction with the accompanying drawings.

DETAILED DESCRIPTION OF PREFERRED EMBODIMENTS

Figure 1:
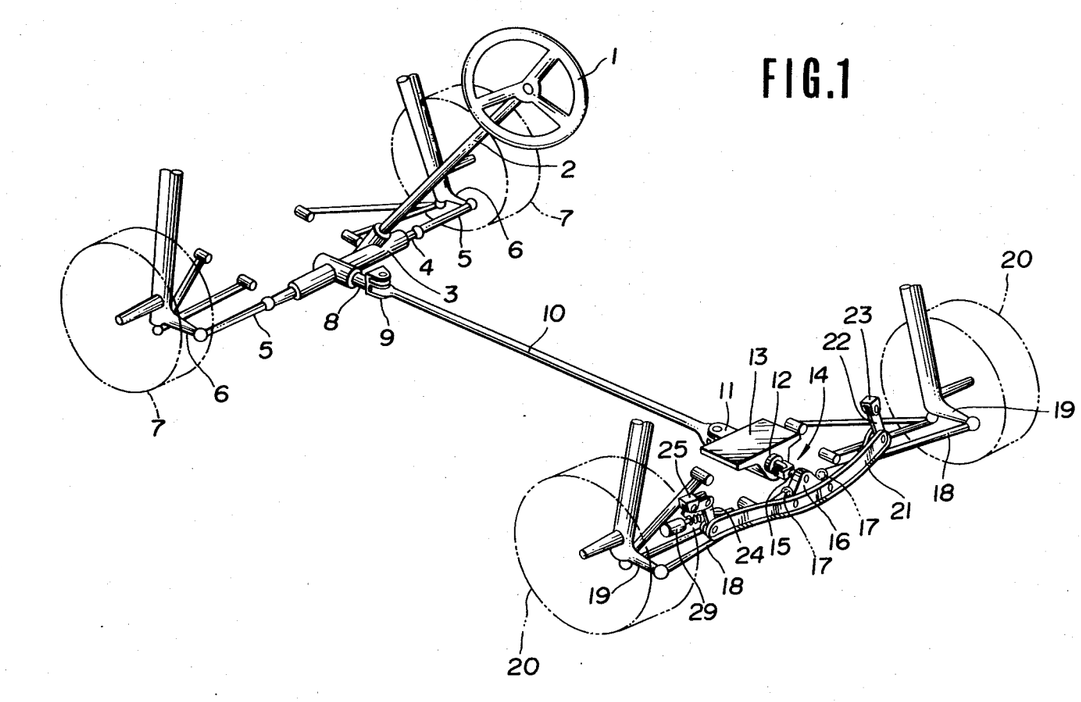
FIG. 1 is a schematic perspective view showing a basic structure of a vehicle provided with a steering system according to a preferred embodiment of the invention.
Figure 2:
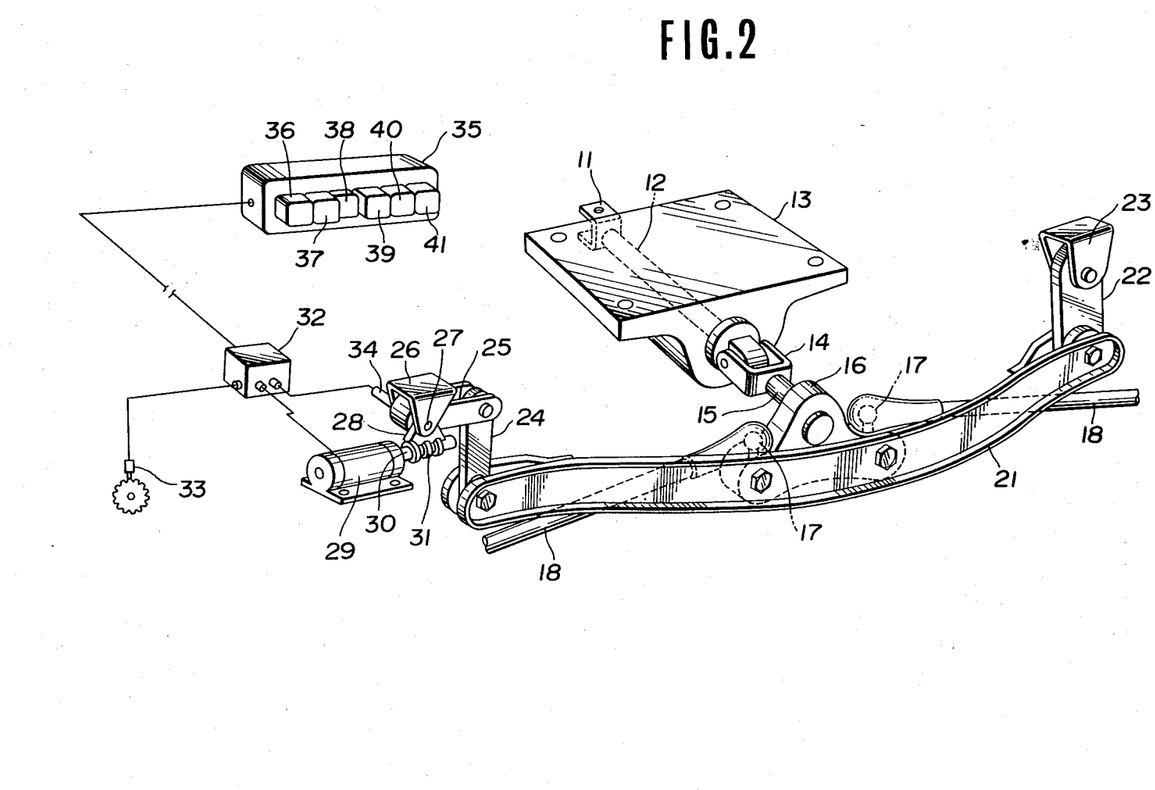
FIG. 2 is an enlarged perspective view of an essential part of a rear wheel steering mechanism of the steering system of FIG. 1.

There will be described hereinbelow a steering system for vehicles according to a preferred embodiment of the invention, which includes a basic steering system substantially equivalent to that of the above-mentioned known steering system. FIGS. 1 and 2 show the arrangement of the basic steering system, the function of which will be described in detail hereinbelow with reference to FIGS. 3a to 3c.

Referring first to FIG. 1, designated at reference numeral 1 is a steering wheel. The steering wheel 1 is fastened to the upper end of a steering shaft 2 assembled at the lower end thereof in a gearbox 3 of a rack and pinion type, which has a rack shaft 4 connected at each transverse end thereof through one of a pair of tie rods 5, 5 to one of a pair of knuckle arms 6, 6 each respectively supporting one of a pair of front wheels 7, 7, to be steered in the same steering direction as the steering wheel 1, whereby a well known front wheel steering mechanism is constituted.

The gearbox 3 further has a pinion shaft 8 projected rearwardly therefrom, the shaft 8 being connected at the rear end thereof through a universal joint 9 to the front end of a relatively long linkage shaft 10, which in turn is connected at the rear end thereof to an input shaft 12 of a rear wheel steering mechanism, the input shaft 12 extending along the longitudinal center line of a vehicle body (not shown) and being rotatably supported by means of a bearing bracket 13 secured to the vehicle body. The rear end of the input shaft 12 is connected through a bifurcated joint 14 to a swingable shaft 15 having at the rear part thereof a joint member 16 loosely fitted thereon. The joint member 16 is connected at each transverse end thereof through one of a pair of ball joints 17, 17 to the inner end of one of a pair of tie rods 18, 18, while being secured to the middle part of an arm member 21 extending transversely of the vehicle. The tie rods 18, 18 are each respectively connected at the outer end thereof to one of a pair of knuckle arms 19, 19 which support a pair of rear wheels 20, 20, respectively.

Referring now to FIG. 2, the arm member 21 is suspended at the right end thereof through a link plate 22 and a bracket 23 from the vehicle body, so as to be swingable in a vertical plane perpendicular to the longitudinal center line of the vehicle, which plane thus substantially includes the arm member 21, and slightly movable in the longitudinal direction of the vehicle. Also at the left end, the arm member 21 is suspended through a link plate 24, a link member 25, and a bracket 26 from the vehicle body, and is thereby adapted to be swingable in the vertical plane and slightly movable longitudinally of the vehicle. The link member 25 has fixed thereto a pivot shaft 27, on which the bracket 26 pivots, and thus is integrally rotatable therewith. The pivot shaft 27 has fixed on the middle part thereof a sector gear 28 meshing with a worm gear 31 formed on an output shaft 30 of an electric motor 29 mounted on the vehicle body, the output shaft 30 extending transversely of the vehicle body.

Moreover, the vehicle has mounted thereon a microcomputer 32 receiving a below-described vehicle speed signal from a vehicle speed sensor 33 detecting the vehicle speed and a below-described steered angle ratio signal from an arm position sensor 34 detecting a control position of the arm member 21 by sensing an angular displacement of the pivot shaft 27, i.e., of the link member 25. The computer 32 is adapted to supply a below-described control signal to the motor 29 in accordance with the vehicle speed.

In the above-described arrangement, a mechanism for changing a steered angle ratio $\gamma$ of the rear wheels 20, 20 to the front wheels 7, 7 is constituted by the swingable shaft 15, the joint member 16, the arm member 21, the combination of the link plate 22 and the bracket 23, and the combination of the link plate 24, the link member 25, the sector gear 28, the motor 29, and the worm gear 31.

Figure 3A:
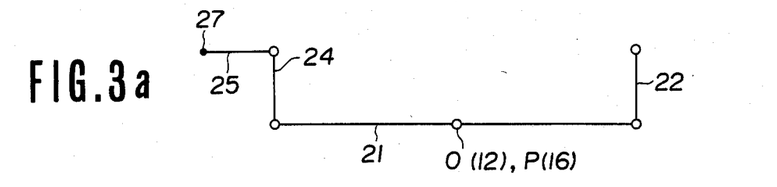
FIGS. 3a to 3c are schematic partial rear views for functional description of the rear wheel steering mechanism of FIG. 2.
Figure 3B:
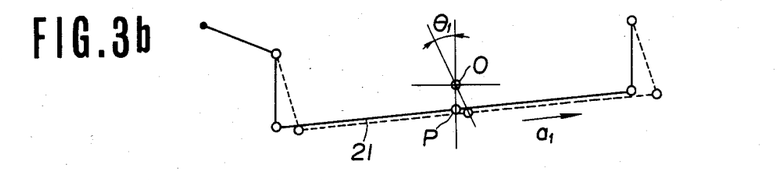
Figure 3C:
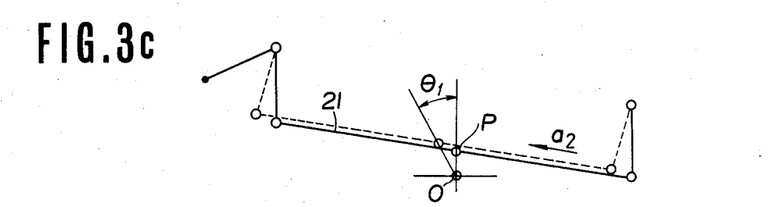

With reference to FIGS. 3a to 3c, which are rear views schematically showing the positional relations among the arm member 21, the link plates 22, 24, the link member 25, and the pivot shaft 27 as essential parts of the above-mentioned ratio changing mechanism of the steered angle ratio $\gamma$, there will be described hereinbelow the function of the ratio changing mechanism, as it is put in a below-described control mode corresponding to a characteristic curve $Q_3$: $\gamma = f_3(V)$ of FIG. 5.

When the vehicle speed V is equal to a predetermined speed $d_1$ of FIG. 5, the joint member 16 has a pivot point P thereof on the extension of a center axis 0 of the input shaft 12, as shown in FIG. 3a. In such case, the swingable shaft 15 is permitted to coaxially rotate with the input shaft 12, so that the joint member 16 will not laterally swing, thus being kept from actuating the rear tie rods 18, 18. Accordingly, when the steering wheel 1 is operated, only the front wheels 7, 7 will be steered, leaving the rear wheels 20, 20 unsteered, similar to a conventional vehicle without a rear wheel steering mechanism.

On the other hand, when the vehicle speed V is lower than the predetermined value $d_1$, the computer 32 receiving the vehicle speed signal from the vehicle speed sensor 33 makes a corresponding judgment, whereby the motor 29 is controlled in the number of revolutions in response to the detected vehicle speed, causing the worm gear 31 on the output shaft 30 of the motor 29 to be rotated, thus correspondingly rotating the sector gear 28 engaged with the worm gear 31. As a result, as shown in FIG. 3b, the link member 25 integrally rotatable with the sector gear 28 is caused to pivot downwardly about the pivot shaft 27, bringing down the link plate 24, so that the arm member 21 goes down at the left end thereof, i.e., swings counterclockwise in FIG. 3b about the right end thereof into a leftwardly descending position thereof, resulting in negative values for the steered angle ratio $\gamma$. More particularly, while the arm member 21 is in such a leftwardly descending position, the joint member 16 has the pivot point P below the center axis 0 of the input shaft 12, and therefore, when the steering wheel 1 is operated so as to rotate the input shaft 12 counterclockwise by an angle $\theta_1$ as in the case of FIG. 3b, the tie rods 18, 18 connected to the joint member 16 move in the direction of an arrow a, $a_1$ i.e., rightwardly. The rear wheels 20, 20 are thus caused to be steered in the opposite direction as the front wheels 7, 7, whereas the steered angle ratio $\gamma$ is continuously varying in accordance with the vehicle speed V, such that $\gamma = f_3(V)$.

To the contrary when the vehicle speed V is higher than the predetermined value $d_1$, the computer 32 makes the motor 29 reversely rotate in accordance with the vehicle speed. As a result, as shown in FIG. 3c, the arm member 21 has a rightwardly descending position thereof, resulting in positive values for the steered angle ratio $\gamma$. Accordingly, when the steering wheel 1 is operated so as to rotate the input shaft 12 counterclockwise by an angle $\theta_1$ as in the case of FIG. 3b, the tie rods 18, 18 connected to the joint member 16 move in the direction of an arrow $a_2$, i.e., leftwardly. The rear wheels 20, 20 are thus caused to be steered in the same direction as the front wheels 7, 7, whereas the steered angle ratio $\gamma$ is still continuously varying in accordance with the vehicle speed V, such that $\gamma = f_3(V)$.

The computer 32 comprises a microcomputer system including, but not limited to, a plurality of integrated circuits (not shown) such as a CPU, a ROM, a RAM, and a plurality of peripheral interfaces.

There will now be described the arrangement as well as the function of an essential part of the steering system according to the preferred embodiment of the invention, with reference to FIGS. 2 and 4 to 7.

Referring again to FIG. 2, the computer 32 is connected to a manually operable select switch assembly 35 having a group of pushbuttons 36 to 41 arranged in a line. The select switch assembly 35 is mounted on an instrument panel (not shown) of the vehicle and adapted for exclusively selecting an arbitrary one of below-described six control modes, in each of which the steered angle ratio $\gamma$ is variable in accordance with the vehicle speed V, depending on a corresponding one of six characteristic functions $f_i(V)$, where "i" is an arbitrary integer from 1 to 6 inclusive. For convenience of operation, the six pushbuttons 36 to 41 are adapted for selecting, in a one-to-one correspondence manner, the characteristic functions $f_1(V)$ to $f_6(V)$, in this order.

Figure 4:
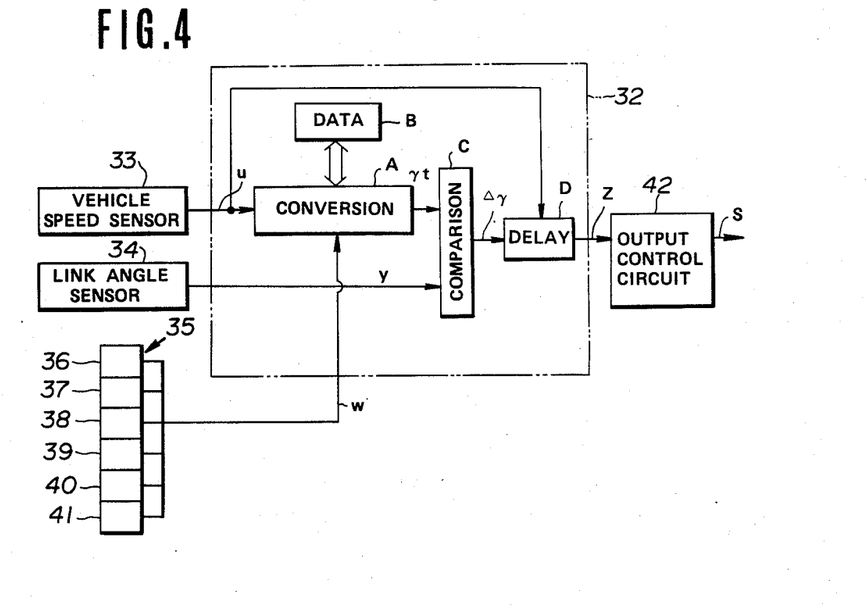
FIG. 4 is a functional block diagram of a control part of the steering system of FIG. 1.

Referring now to FIG. 4, the vehicle speed signal from the vehicle speed sensor 33 is input to the computer 32, as a speed data signal u representing a particular vehicle speed V as detected, which signal u is processed through a conversion process A to determine an ideal steered angle ratio $\gamma_t$, depending on a previously selected one of the characteristic functions $f_i(V)$. More particularly, the computer 32 has stored in a memory thereof, as characteristic data B for the conversion A, a set of ideal steered angle ratios $\gamma_t$ predetermined by the characteristic functions $f_i(V)$, so that in the conversion process A there can be obtained, from the speed data signal u, a corresponding one of the ideal steered angle ratios $\gamma_t$, when a particular ratio control mode corresponding to one of the characteristic functions $f_i(V)$ is selected by pushing one of the pushbuttons 36 to 41 of the select switch assembly 35. In this respect, for use in the conversion process A, the computer 32 has input therein from the select switch assembly 35 a data signal w representing a particular state of the assembly 35 as selected.

On the other hand, the steered angle ratio signal from the arm position sensor 34, which senses the angular displacement of the link member 25 corresponding to an actual steered angle ratio $\gamma_a$ of the vehicle, is input to the computer 32, as a ratio data signal y representing a particular value of the actual steered angle ratio $\gamma_a$ as detected, which signal y is subjected to a comparison process C, in which the actual steered angle ratio $\gamma_a$ is compared with the ideal steered angle ratio $\gamma_t$ resulting from the conversion process A, to thereby obtain a relative difference $\Delta\gamma$ between the ratios $\gamma_a$ and $\gamma_t$.

As will be understood, the ratio difference $\Delta\gamma$ is a quantity by which the actual steered angle ratio $\gamma_a$ is expected to be corrected, while such a correction is desired to be effected continuously over an adequate time period to be empirically determined in consideration of the magnitude of the ratio difference $\Delta\gamma$ as well as the vehicle speed V.

In this respect, in the computer 32, a data signal representing a particular value of the ratio difference $\Delta\gamma$ is subjected to a delay process D, where it is delayed to be output from the computer 32 in the form of an asymptotically varying output signal z over an extended time period as a below-described delay time T. Particularly when the select switch assembly 35 is operated to change the ratio control mode, the delay process D serves for gradually outputting, over the delay time T, the output signal z, which represents a correction quantity depending on the difference between the steered angle ratio $\gamma$ just before the mode change operation and that to be finally set thereafter.

The output signal z of the computer 32 is input to an output control circuit 42, where it is converted through a digital to analog converter (not shown) and amplified through an amplifier (not shown) to obtain a control signal s to be fed to the motor 29, so that the motor 29 is controlled in correspondence to the asymptotical variation of the output signal z.

As a result, even when the ratio control mode is changed by operating the select switch assembly 35, the steered angle ratio $\gamma$ is to vary, not suddenly, but gradually with the time from a value just before the operation to a value to be given by that one of the characteristic functions $f_i(V)$ which corresponds to the selected control mode.

Referring now to FIG. 5, the characteristic functions $f_i(V)$ are exclusively or alternatively selectable by the select switch assembly 35 with the pushbuttons 36 to 41, to establish a selective one of the six control modes for the ratio control of the steered angle ratio $\gamma$, as described hereinabove. As shown in FIG. 5, in a control mode corresponding to a characteristic function $f_1(V)$, the steered angle ratio $\gamma$ in a positive region thereof will not become large even for relatively large values of the vehicle speed V, so that the steering characteristic feels sporty. On the contrary, in a control mode corresponding to a characteristic function $f_6(V)$, the steered angle ratio $\gamma$ becomes positive even when the vehicle speed V is relatively low, thus giving a mild feeling to the steering characteristic. As described hereinabove, in the control mode corresponding to the characteristic function $f_3(V)$ plotted as the characteristic curve $Q_3$, the steered angle ratio $\gamma$ becomes zero at the predetermined value $d_1$ of the vehicle speed V. Likewise, in a control mode under a characteristic function $f_2(V)$ and the control mode under the function $f_1(V)$, the ratio $\gamma$ becomes zero at vehicle speeds $d_2$ and $d_3$, respectively. As shown in FIG. 5, when plotted, the characteristic functions $f_1(V)$ to $f_6(V)$ draw their characteristic curves extending side by side in the same order, including the curve $Q_3$. When setting the ratio gap between a neighboring two of the six characteristic curves at an arbitrary vehicle speed V to be $\gamma_p$, the ratio difference $\Delta\gamma = \gamma_p$ in any mode change between such two curves.

Figure 6:
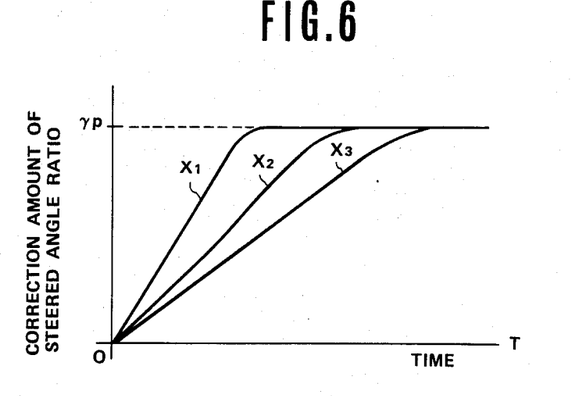
FIG. 6 is a graph showing the relation between a steered angle ratio and a delay time for typical control mode changes of the control part of FIG. 4.

FIG. 6 is a plot of three typical characteristic curves $X_1$ to $X_3$ of the delay process D in the computer 32, showing corresponding variations of the steered angle ratio $\gamma$, as it is corrected from zero to $\gamma_p$ with the time T, in typical changes of the ratio control mode, respectively. The curve $X_1$ shows the development of such variation in a mode change from $f_3(V)$ to $f_4(V)$ at the vehicle speed $d_1$. Likewise, the curves $X_2$ and $X_3$ correspond to mode changes from $f_2(V)$ to $f_3(V)$ and from $f_1(V)$ to $f_2(V)$ at the vehicle speeds $d_2$ and $d_3$, respectively.

As shown in FIG. 6, the delay time T necessary to complete a ratio correction from a steered angle ratio $\gamma_1$ having been set just before the correction to a new steered angle ratio $\gamma_2$ to be finally set after the correction depends on the vehicle speed V, such that, for an even magnitude of ratio difference $|\Delta\gamma| = |\gamma_1 - \gamma_2|$, the delay time T increases as the vehicle speed V becomes higher. In FIG. 6, the ratio difference $\Delta\gamma$ corresponds to the ratio gap $\gamma_p$ between neighboring characteristic curves, as described hereinabove. The correction of the steered angle ratio $\gamma$ under the computer 32 is therefore effected more slowly as the vehicle speed V increases.

The respective processes in the computer 32 are sequentially exercised in accordance with a program written in a ROM as the memory of the computer 32, including the delay process D. In other words, a delay effect on the output signal z for correcting the steered angle ratio $\gamma$ by the ratio difference is achieved by software of the computer 32. In this respect, however, a similar effect may be obtained outside a computer, by employing a suitable delay means such as a low-pass filter or an integral circuit to have an output signal of the output control circuit 42 delayed over a proper time period.

Figure 7:
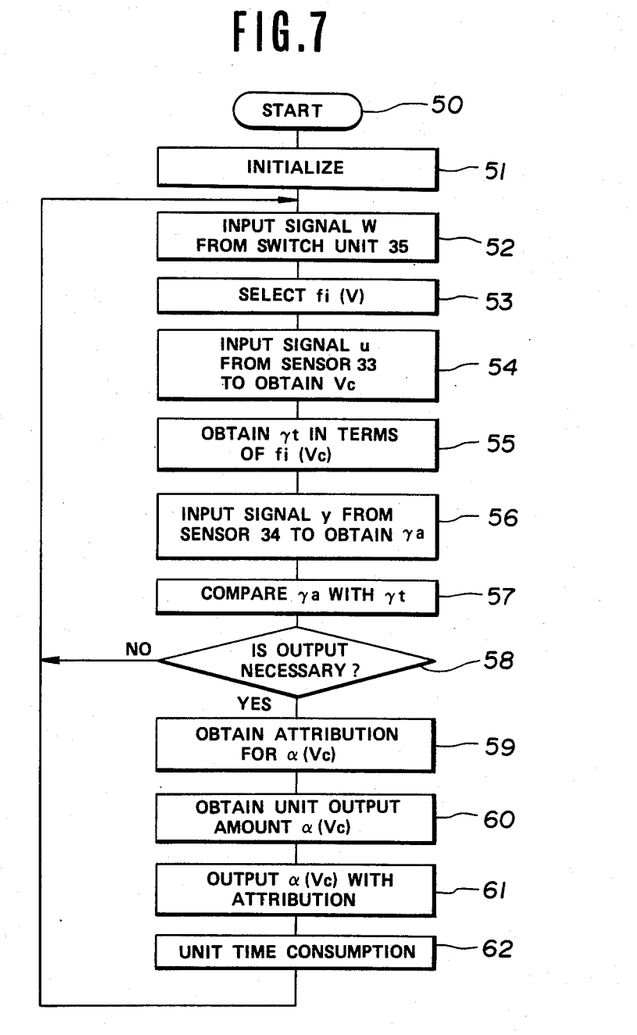
FIG. 7 is a schematic flowchart of a program for a microcomputer system of the control part of FIG. 4.

FIG. 7 is a flowchart showing the program stored in the ROM of the computer 32.

As shown in FIG. 7, the program starts at a stage 50 when the microcomputer system is powered on or reset, and goes to an initializing stage 51 for initializing the peripheral interfaces to set necessary variables.

Thereafter, the program flow enters a base loop comprising a plurality of stages 52 to 62. At the first stage 52 of the base loop, the data signal w representing a switch state of the select switch assembly 35 is input to read data thereon, and at a stage 53, one of the characteristic functions $f_i(V)$ is selected in accordance with the data of the signal w. At a subsequent stage 54, the speed data signal u representing a current value Vc of the vehicle speed V is input to read data thereon, thereby obtaining the current speed Vc, and at a stage 55 next thereto, an ideal steered angle ratio $\gamma_t$ is determined by substituting the current vehicle speed Vc into the selected characteristic function $f_i(v)$. Then, at a stage 56, the ratio data signal y representing an actual steered angle ratio $\gamma_a$ is input to read data thereon, thereby obtaining the actual ratio $\gamma_a$.

At a subsequent stage 57, the actual ratio $\gamma_a$ is compared with the ideal ratio $\gamma_t$, and at a decision stage 58, the result of this comparison is interrogated to judge whether the output of the output signal z to the output control circuit 42 is necessary or not. When such an output is judged unnecessary because the actual ratio $\gamma_a$ is equal to the ideal ratio $\gamma_t$, the program flow goes to the first stage 52 of the base loop.

In the case where the output of the output signal z is judged necessary at the stage 58 because the actual ratio $\gamma_a$ is different from the ideal ratio $\gamma_t$, then at a subsequent stage 59 a below-described unit output quantity $\alpha(V)$ as a unique positive function of the vehicle speed V has its attribution identified in terms of a sign to be plus (+) or minus (−) in accordance with the result of a subtraction $(\gamma_a - \gamma_t)$ to be plus or minus. Moreover, at a stage 60, the unit output quantity $\alpha(V)$ has a unique value $\alpha(Vc)$ determined by substituting therein the current speed Vc. Incidentally, the unit output quantity $\alpha(V)$ is a parameter to be processed in the output control circuit 42 to determine the number of revolutions by which the motor 29 is to be rotated for the ratio control, while the rotating direction of the motor 29 is identified by the attributive sign of the quantity $\alpha(V)$. In this respect, the function $\alpha(V)$ is given as a monotone decreasing function of the vehicle speed V. Then, at a stage 61, the unique quantity $\alpha(Vc)$ is output together with the attributive sign as the output signal z to the output control circuit 42, which in turn outputs the control signal s for rotating the motor 29 by a unit angular displacement corresponding to the output signal z.

At the last stage 62 of the base loop, a time period of approximately 50 msec. elapses before the program flow goes to the first stage 52 of the base loop.

As will be understood from the foregoing description, according to the present embodiment of the invention, a unit correction process through the base loop consisting of the stages 52 to 62 is to be repeated until the actual ratio $\gamma_a$ becomes equal to the ideal ratio $\gamma_t$. As a result, even in the case where, at the vehicle speed $d_3$ of FIG. 5, from the control mode under $f_1(V)$ as initially set, the control mode under $f_6(V)$ is once selected before a subsequent prompt change thereof to the control mode under $f_2(V)$, there can be avoided such an ineffective action that the steered angle ratio $\gamma$ once increases from zero, past the finally intended ratio $\gamma_p$, to a relatively large positive value $f_6(d_3)$ before it returns to $\gamma_p$.

In the foregoing embodiment, the characteristic data B for the conversion process A of FIG. 4 is stored in advance in the memory of the computer 32. In this respect, the ideal steered angle ratio $\gamma_t$ obtained from the data B may be favorably computed by substituting the current vehicle speed Vc into one of the characteristic functions fi(V), as it is then selected, in order to make efficient use of the memory.

Figure 8:
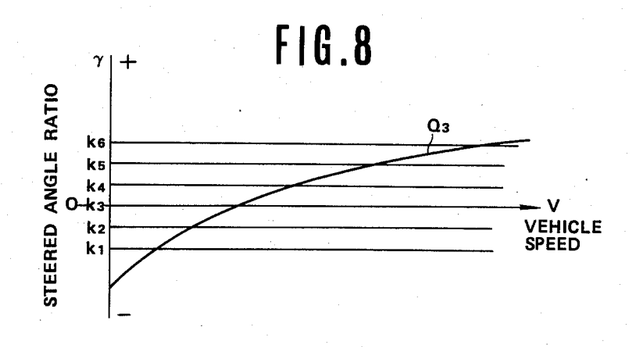
FIG. 8 is a graph plotting respective characteristic curves of various control modes of a steering system for vehicles according to a modified example of the preferred embodiment.

FIG. 8 is a graph plotting respective characteristic curves of various control modes of a steering system for vehicles according to a modified example of the preferred embodiment, in which like items are designated by like reference characteristic in relation to the above-described preferred embodiment.

The steering system according to the modified example is different from the preferred embodiment in that a steered angle ratio $\gamma$ of rear wheels to front wheels is permitted to exclusively take one of six constant values ki irrespective of a vehicle speed V, where the suffix "i" is an arbitrary integer from 1 to 6 inclusive, and/or a value depending on a characteristic curve $Q_3$ defined by a characteristic function $f_3(V)$.

In this steering system, a computer 32 is adapted to follow a program similar to that of the preferred embodiment, while being modified therefrom such that, instead of the stages 52 to 55 of FIG. 7, a single process stage is provided to determine an ideal steered angle ratio $\gamma_t$, in the case where the steered angle ratio $\gamma$ is intended so as to take an arbitrary one of the six values ki only, for such a value ki as actually selected is always equal to the ideal ratio $\gamma_t$.

Incidentally, in each of the foregoing steering systems, the microcomputer 32 mounted in the vehicle is employed. In this respect, in place of the computer 32, there may be employed an electric circuit having a compatible function.

Moreover, in place of the select switch assembly 35 constituted by the pushbuttons 36 to 41, there may be employed a continuously variable switch means such as of a sliding type.

Further, the present invention may be embodied as a steering system with front and rear wheels having hydraulically controlled steering, in which data on a steering angle of the front wheel are hydraulically transmitted, or as a steering system, in which data on a steering angle of a front wheel are directly transmitted to a computer by means of an electric signal.

As will be understood from the foregoing description, according to the present invention there is provided a steering system for a vehicle with a front wheel and a rear wheel, in which the rear wheel is steerable in relation to a steering operation of the front wheel, such that a steered angle ratio of the rear wheel to the front wheel is controlled to be variable in accordance with a travelling speed of the vehicle, permitting an arbitrary one of a plurality of characteristic functions of the steered angle ratio to be voluntarily selected by a manual operation for setting a particular steered angle ratio in accordance with the vehicle speed. As a result, optimum steering control modes with respect to a travelling state of the vehicle are attained, to be selectable in accordance with subjective factors such as the preference or physical condition of a driver while travelling, as well as objective factors such as road conditions, for example those in travel along an expressway. The maneuverability is thus improved, while fundamental advantages of the front and rear wheel steering are retained, such that the steering responsiveness is favorably sharp while travelling at relatively high speeds and the vehicle turning characteristics are favorably improved at relatively low vehicle speeds. Moreover, there is employed a delay process permitting, when changing one of the control modes to another thereof, a gradual transfer of the steered angle ratio, so that the steered angle ratio can be gradually varied with the time even when a mode select means is operated during turning travel, thereby achieving a favorable steering characteristic.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

We claim:
1. A steering system for a vehicle with a front wheel and a rear wheel, including:
   a steering wheel;
   front wheel steering means for steering said front wheel;
   rear wheel steering means for steering said rear wheel;
   ratio changing means for changing a steered angle ratio of said rear wheel to said front wheel;
   control means for controlling said ratio changing means;
   ratio detecting means for detecting said steered angle ratio;
   said ratio detecting means cooperating with said control means;
   speed detecting means for detecting a vehicle speed of said vehicle; and
   said speed detecting means cooperating with said control means;
   in which a ratio control of said steered angle ratio is effected to be variable in accordance with said vehicle speed,
   wherein:
   mode selecting means adapted to be manually operable and operatively connected to said control means is provided for exclusively selecting an arbitrary one of a plurality of control modes of said ratio control.

2. A steering system according to claim 1, wherein:
   said control means comprises a microcomputer system provided with at least a memory; and
   said mode selecting means comprises pushbuttons corresponding in number to the number of said control modes, select switch means connected to said microcomputer system, and control mode data stored in said memory.

3. A steering system according to claim 1, wherein:
   time-delay means is provided for gradually outputting a control signal from said control means to said ratio changing means when one of said control modes is changed to another thereof.

4. A steering system according to claim 3, wherein:
   said control means comprises a microcomputer system provided with at least a memory; and
   said time-delay means comprises a program stored in said memory.

5. A steering system according to claim 3, wherein:
   said control signal output from said time delay means is proportional to vehicle speed.

* * * * *

UNITED STATES PATENT AND TRADEMARK OFFICE
CERTIFICATE OF CORRECTION

PATENT NO. : 4,660,844
DATED : April 28, 1987
INVENTOR(S) : Osamu YAMAMOTO et al.

It is certified that error appears in the above-identified patent and that said Letters Patent is hereby corrected as shown below:

Column 5, line 55, change "fi(V)" to $--f_i(V)--$.

Column 7, line 55, change "$f_i(v)$" to $--f_i(V)--$.

Column 8, line 44, change "fi(V)" to $--f_i(V)--$.

Signed and Sealed this

Sixth Day of October, 1987

Attest:

DONALD J. QUIGG

*Attesting Officer*  *Commissioner of Patents and Trademarks*